(12) United States Patent
Riibe

(10) Patent No.: US 8,915,515 B1
(45) Date of Patent: Dec. 23, 2014

(54) GOOSENECK HITCHING SYSTEM

(71) Applicant: Gary Riibe, Herman, NE (US)

(72) Inventor: Gary Riibe, Herman, NE (US)

( * ) Notice: Subject to any disclaimer, the term of this patent is extended or adjusted under 35 U.S.C. 154(b) by 0 days.

(21) Appl. No.: 14/020,036

(22) Filed: Sep. 6, 2013

(51) Int. Cl.
*B60D 1/06* (2006.01)
*B60D 1/01* (2006.01)

(52) U.S. Cl.
CPC ............. *B60D 1/065* (2013.01); *B60D 1/015* (2013.01)
USPC ........... 280/512; 280/511; 280/507; 280/504

(58) Field of Classification Search
CPC ............................... B60D 1/065; B60D 1/015
USPC ................ 280/512, 511, 507, 504, DIG. 901
See application file for complete search history.

(56) References Cited

U.S. PATENT DOCUMENTS

| 4,320,907 | A | 3/1982 | Eaton |
| 4,907,815 | A | 3/1990 | Hunger |
| 5,456,484 | A | 10/1995 | Fontaine |
| 5,482,309 | A * | 1/1996 | Hollis ........................ 280/423.1 |
| 5,861,802 | A | 1/1999 | Hungerink et al. |
| 6,234,509 | B1 * | 5/2001 | Lara ............................ 280/425.2 |
| 6,467,793 | B2 | 10/2002 | Putnam |
| 6,588,790 | B2 * | 7/2003 | Hall ............................. 280/513 |
| 6,629,700 | B1 * | 10/2003 | Baptiste ..................... 280/423.1 |
| 7,097,193 | B1 | 8/2006 | Sievert |
| 7,378,013 | B2 * | 5/2008 | Sandler ........................ 280/507 |
| 7,762,529 | B1 * | 7/2010 | Scott ............................ 254/120 |
| 7,926,832 | B1 | 4/2011 | Hall |
| 8,376,388 | B2 | 2/2013 | Graber et al. |
| 2003/0193167 | A1 | 10/2003 | Hall |
| 2005/0253360 | A1 | 11/2005 | Steyn |
| 2013/0334793 | A1 * | 12/2013 | LaPrade ....................... 280/511 |

* cited by examiner

*Primary Examiner* — Joseph M Rocca
*Assistant Examiner* — Marlon Arce
(74) *Attorney, Agent, or Firm* — Dennis L. Thomte; Thomte Patent Law Office LLC

(57) ABSTRACT

A gooseneck hitching system is disclosed which couples the gooseneck hitch of a trailer to a hitch ball of a vehicle through the use of a remotely RF controlled linear actuator which also includes a locking receptacle structure mounted on the bed of the vehicle which replaces the conventional safety chain arrangement.

8 Claims, 7 Drawing Sheets

GOOSENECK HITCHING SYSTEM

BACKGROUND OF THE INVENTION

1. Field of the Invention

This invention relates to a gooseneck hitching system and more particularly wherein the gooseneck hitching system is remotely controlled.

2. Description of the Related Art

Many trailers are coupled or hitched to a vehicle. In some cases, the vehicle has a hitch ball mounted on the rear end of a longitudinally extending hitch bar and the trailer has a ball receiver socket mounted on the forward end of the trailer tongue. The trailer is hitched to the vehicle by placing the ball receiving socket onto the hitch ball and locking the same thereon.

In other cases, the trailer has a gooseneck hitch structure at the forward end thereof with the gooseneck hitch structure having a vertically disposed post which has a hitch ball receiving pocket or socket formed in the lower end thereof. The hitch ball receiving pocket or socket is moved downwardly onto a hitch ball which extends upwardly from the bed of a truck. When the post has been lowered onto the hitch ball, it is necessary for a person to reach or crawl into the bed of the truck to pivotally move a locking plate into engagement with the hitch ball and lock the same. Such a task is difficult, if not impossible, for an elderly person or a physically impaired person. Further, in most gooseneck hitches, it is necessary to reach into the bed of the truck or crawl thereinto to secure the safety chains which extend between the gooseneck post and the bed of the truck. This task is also difficult, if not impossible, for an elderly person or a physically impaired person. Additionally, the safety chains may become disconnected.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A gooseneck hitching system is disclosed for use with a towing vehicle having a hitch ball mounted in the bed thereof. The trailer has a gooseneck hitch structure at the forward end thereof with the gooseneck hitch structure including a substantially vertically extending column having a lower end. The lower end of the column has a hitch ball receiving socket formed therein configured to selectively receive the hitch ball of the vehicle therein.

A coupling assembly is secured to the lower end of the column for selective coupling onto the hitch ball onto the hitch ball of the vehicle. A horizontally disposed upper plate is secured to the lower end of the column with the upper plate having a hitch ball receiving opening formed therein. A horizontally disposed lower plate is operatively secured to the lower end of the column below the upper plate. The lower plate is spaced from the upper plate and has a hitch ball receiving opening formed therein which registers with the hitch ball receiving opening in the upper plate. A horizontally disposed locking plate is movably positioned between the upper and lower plates and is pivotally secured to the upper and lower plates about a vertical axis so as to be selectively movable between an unlocked position and a locked position.

An electrically operated and RF controlled linear actuator is mounted on the coupling assembly and has a base end and extendable and retractable actuator rod. The base end of the linear actuator is secured to the upper plate. The actuator rod is secured to the locking plate whereby extension of the actuator rod causes the locking plate to move from its unlocked position to its locked position and whereby retraction of the actuator rod causes the locking plate to be moved from its locked position to its unlocked position.

In one embodiment, the coupling assembly includes a selectively vertically movable locking pin which is operatively secured to the actuator rod and the locking plate with the locking pin being movable between an upper unlocked position to a lower locked position. The locking pin, when in its locked position, locks the locking plate to the upper and lower plates.

The gooseneck hitching system of this invention also includes a locking receptacle structure which is mounted on the bed of the vehicle forwardly of the hitch ball. The locking receptacle structure includes a base having a forward end, a rearward end, a first side and a second side. The base has an upstanding first wall with an upper end at the first side of the base with the first wall having a vertically disposed notch, having upper and lower ends, formed therein which extends downwardly thereinto. The base also has an upstanding second wall with an upper end at the second side of the base. The second wall has a vertically disposed notch, having upper and lower ends, formed therein which extends downwardly thereinto. An electrically operated and RF controlled linear actuator is mounted on the base with the linear actuator including an extendable and retractable actuator rod which extends rearwardly therefrom. A horizontally disposed locking mechanism is secured to the actuator rod for movement therewith with the locking mechanism being movable between an unlocked position and a locked position. The locking mechanism is in its unlocked position when the actuator rod of the associated linear actuator is in a retracted position. The locking mechanism is in its locked position when the actuator rod of the associated linear actuator is in an extended position. The locking mechanism extends over the upper ends of the notches in the first and second walls, when the locking mechanism is in its locked position to close the upper ends of the notches.

A horizontally disposed collar is rotatably mounted on the column and has an elongated first shaft, having forward and rearward ends, secured to the collar which extends forwardly therefrom. An elongated second shaft is secured to the first shaft which extends transversely with respect to the first shaft. The second shaft has first and second ends which are configured to be received within the notches of the first and second walls of the base when the locking mechanism is in its unlocked position. The second shaft is maintained within the notches when the locking mechanism is in the locked position. The locking receptacle structure described above replaces the conventional safety chains which are normally used with the coupling structure.

It is therefore a principal object of the invention to provide an improved gooseneck hitching system.

A further object of the invention is to provide a gooseneck hitching system which enables the gooseneck of a trailer to be coupled to the hitch ball of a vehicle by means of a radio controlled linear actuator thereby eliminating the need for a person to climb into the bed of the vehicle to effect the coupling operation.

A further object of the invention is to provide a gooseneck hitching system which replaces the conventional safety chains normally used when coupling a trailer to a hitch ball on a vehicle.

A further object of the invention is to provide a locking receptacle structure mounted on the bed of the vehicle which is remotely radio controlled.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
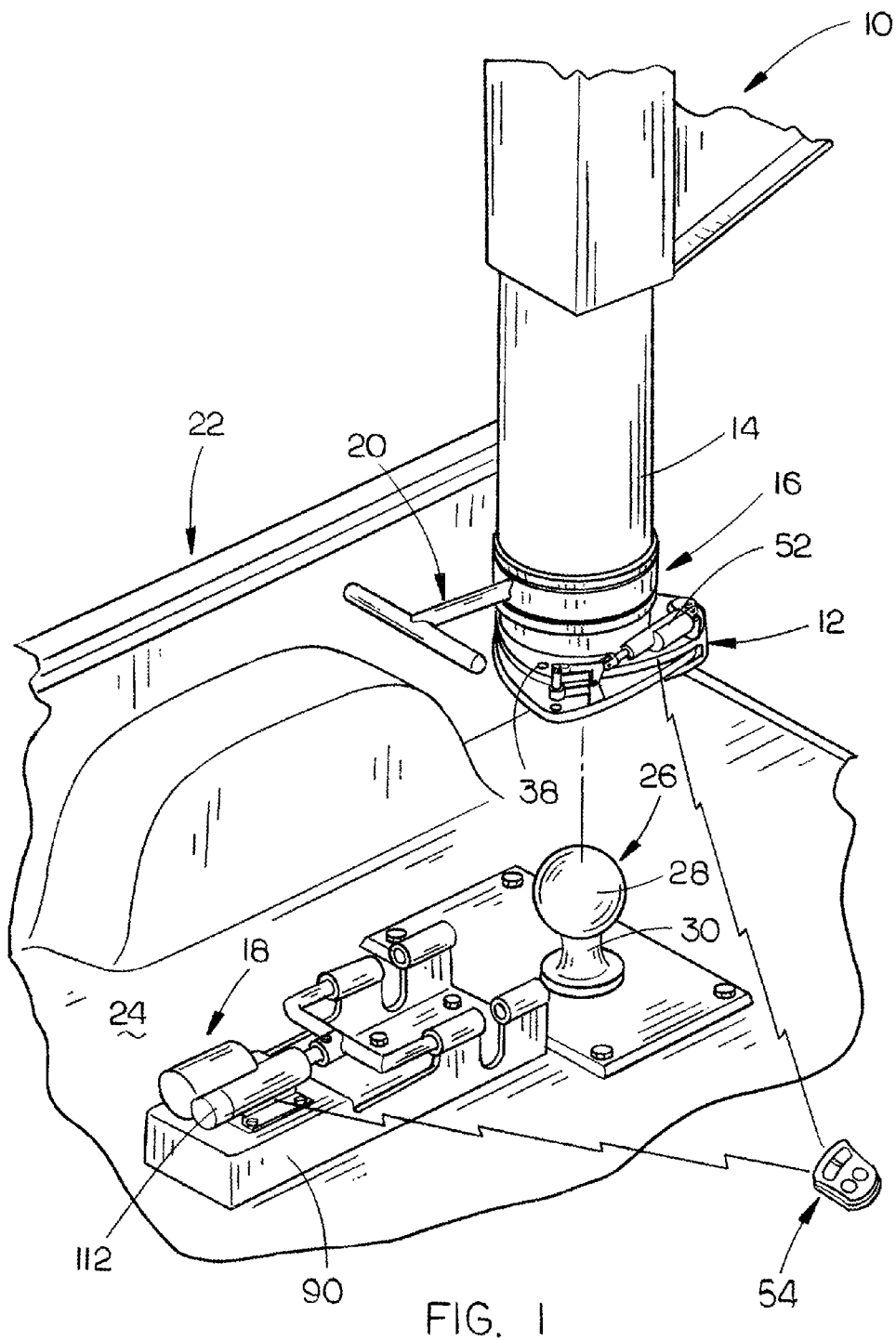
FIG. 1 is a partial perspective view illustrating a gooseneck hitch structure being secured to the hitch ball of the vehicle using the coupling assembly of this invention and the locking receptacle structure of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a gooseneck hitch assembly which is secured to the forward end of a trailer or the like. The hitch assembly 10 is conventional in design except for the coupling assembly 12 at the lower end of the vertically disposed column 14 and the safety structure 16 which is comprised of a locking receptacle structure 18 and locking member 20 which will be described in detail hereinafter. The numeral 22 refers to the towing vehicle which is normally a truck having a bed or floor 24. A hitch ball 26 including a ball 28 and shank 30 is secured to the floor 24 and usually to the frame of the truck. The lower end of column 14 includes a conventional socket coupling at the lower end thereof which is adapted to receive the ball 28 of the hitch ball 26.

Figure 2:
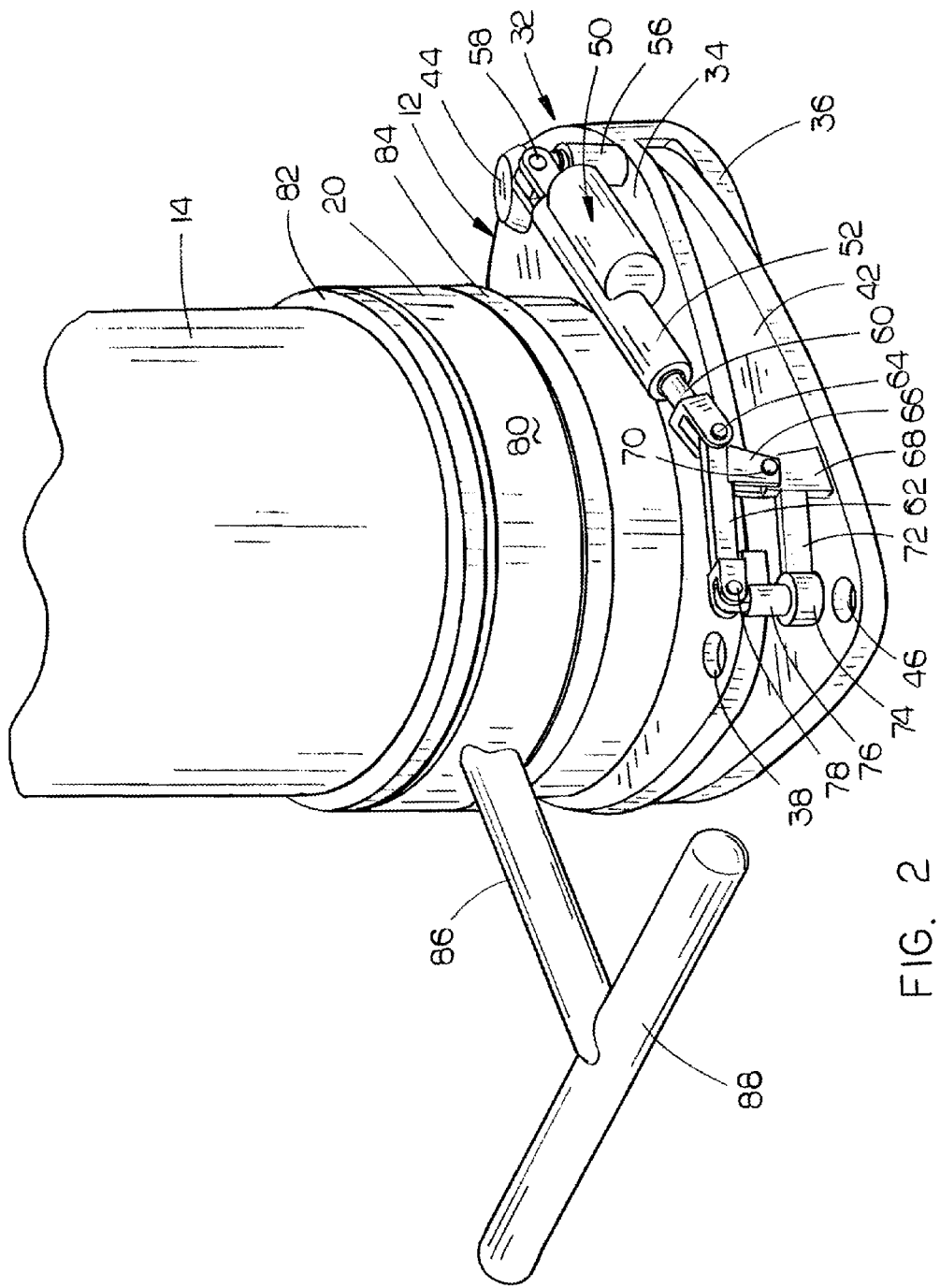
FIG. 2 is a partial perspective view of the coupling assembly of the lower end of the column of the gooseneck together with a portion of the locking structure.
Figure 4:
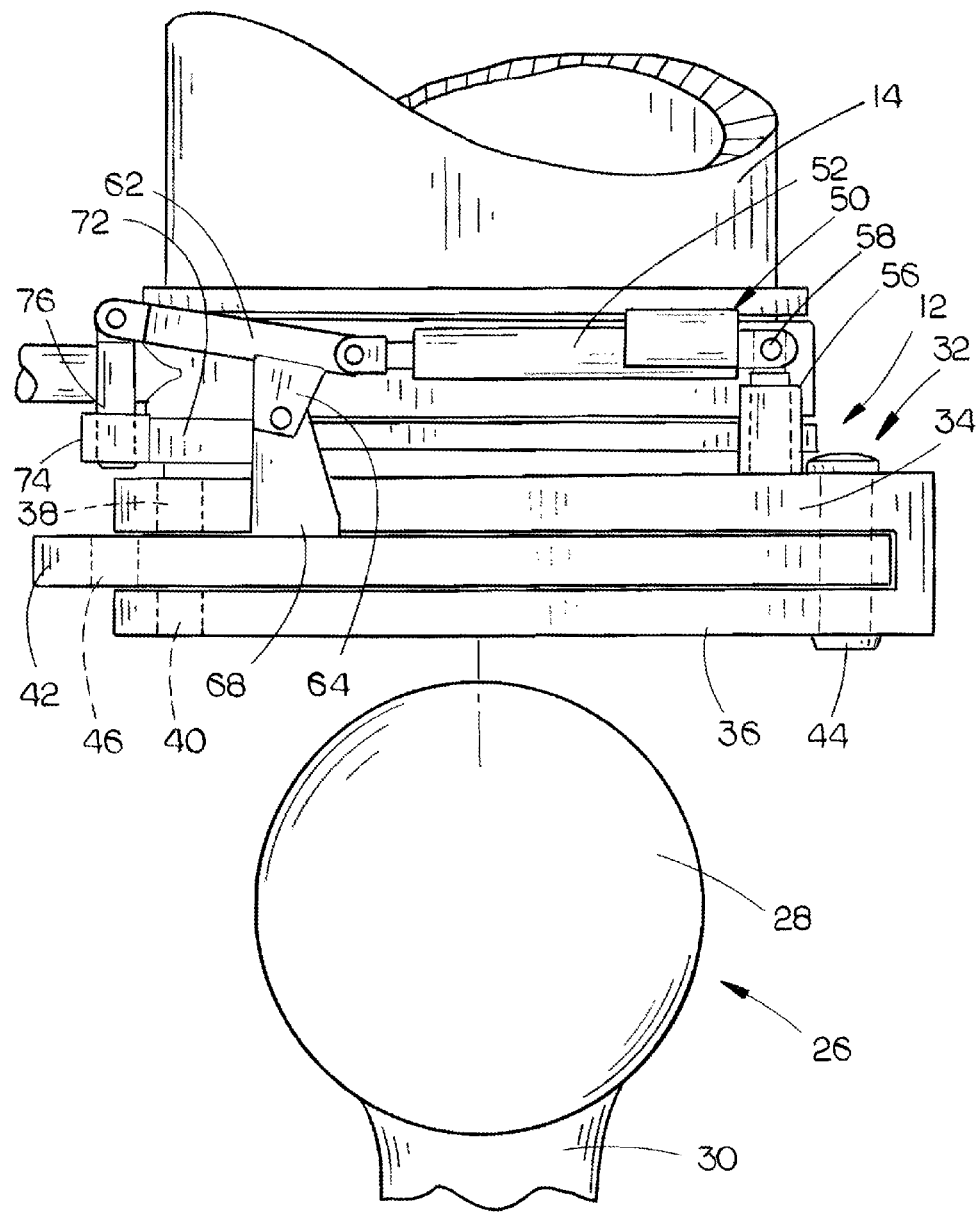
FIG. 4 is a partial slide elevational view illustrating the coupling assembly being positioned above the hitch ball of the vehicle.
Figure 5:
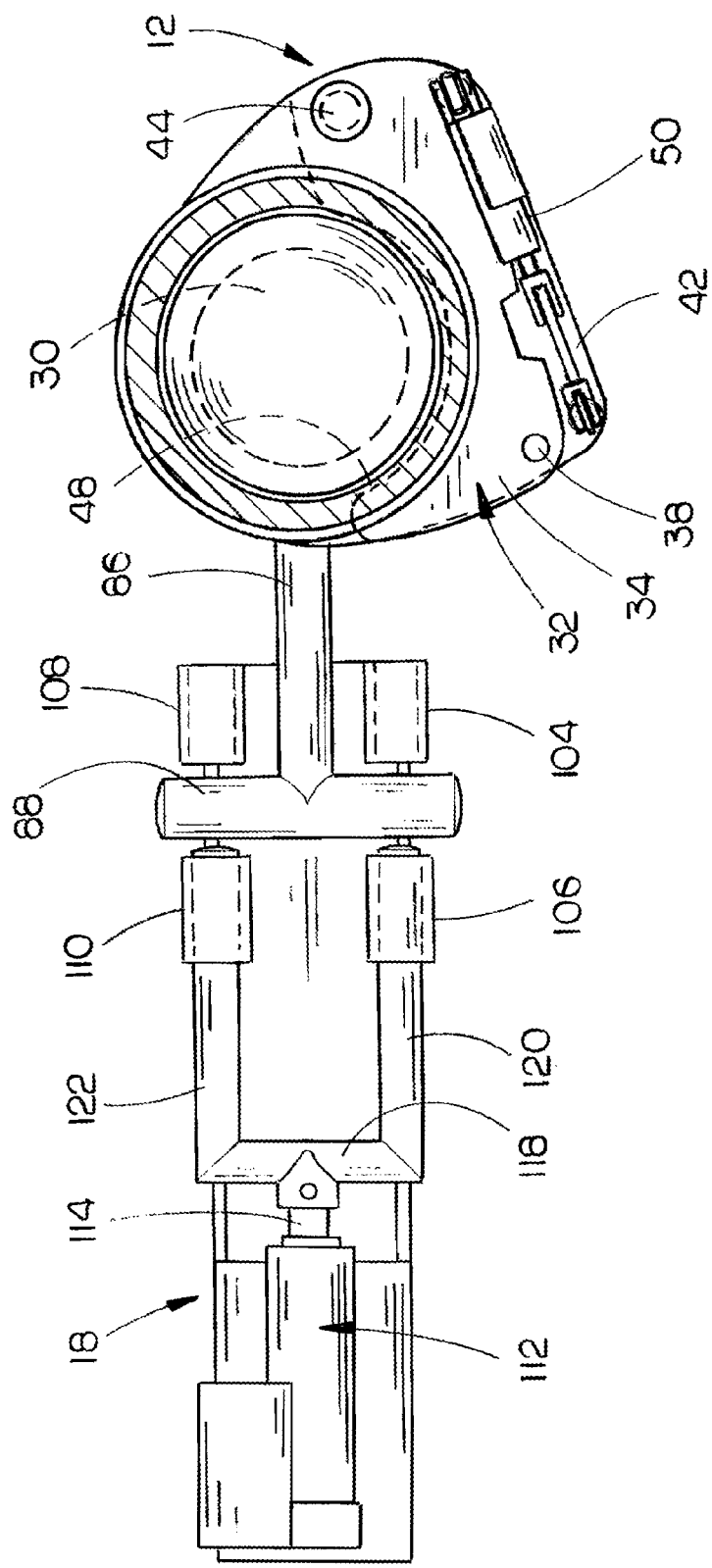
FIG. 5 is a sectional view illustrating the coupling assembly being positioned on the hitch ball with the locking plate of the coupling assembly being in its unlocked position and which illustrates the locking receptacle structure in its unlocked position.
Figure 6:
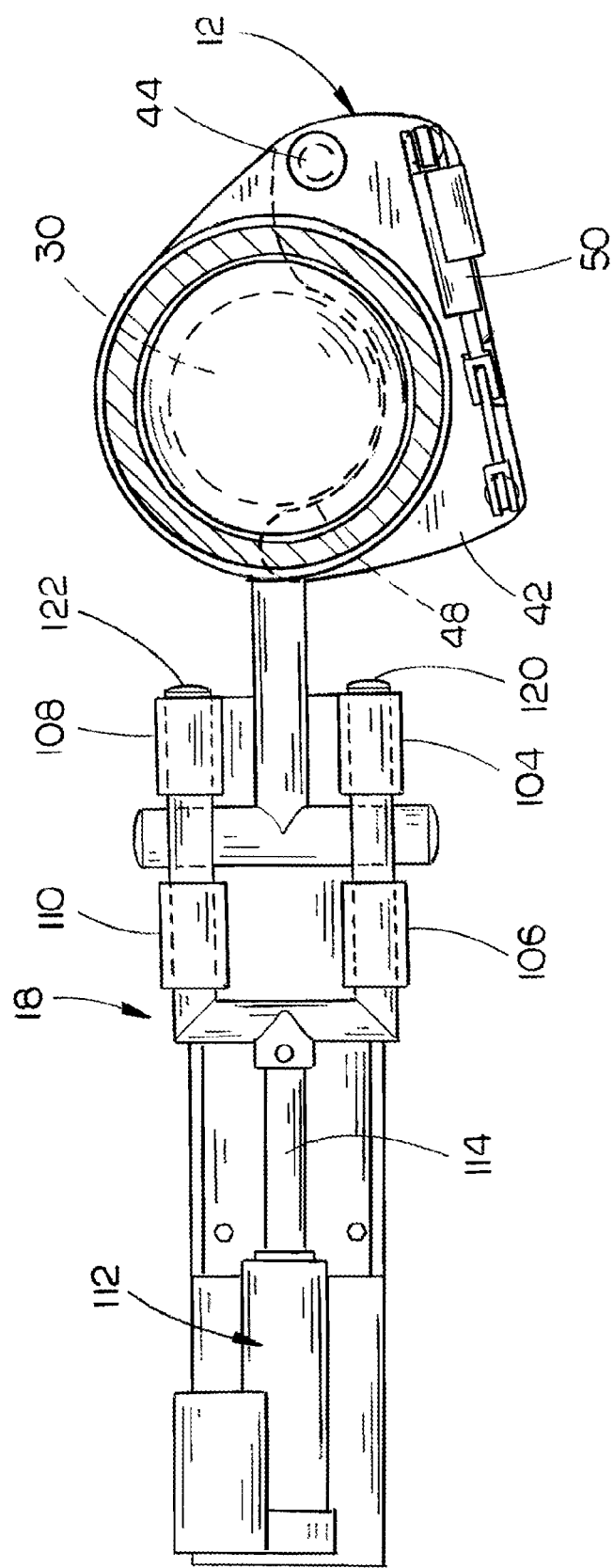
FIG. 6 is a view similar to FIG. 5 except that the locking plate of the coupling assembly has been moved to its locked position and the locking receptacle structure has been moved to its locked position.
Figure 7:
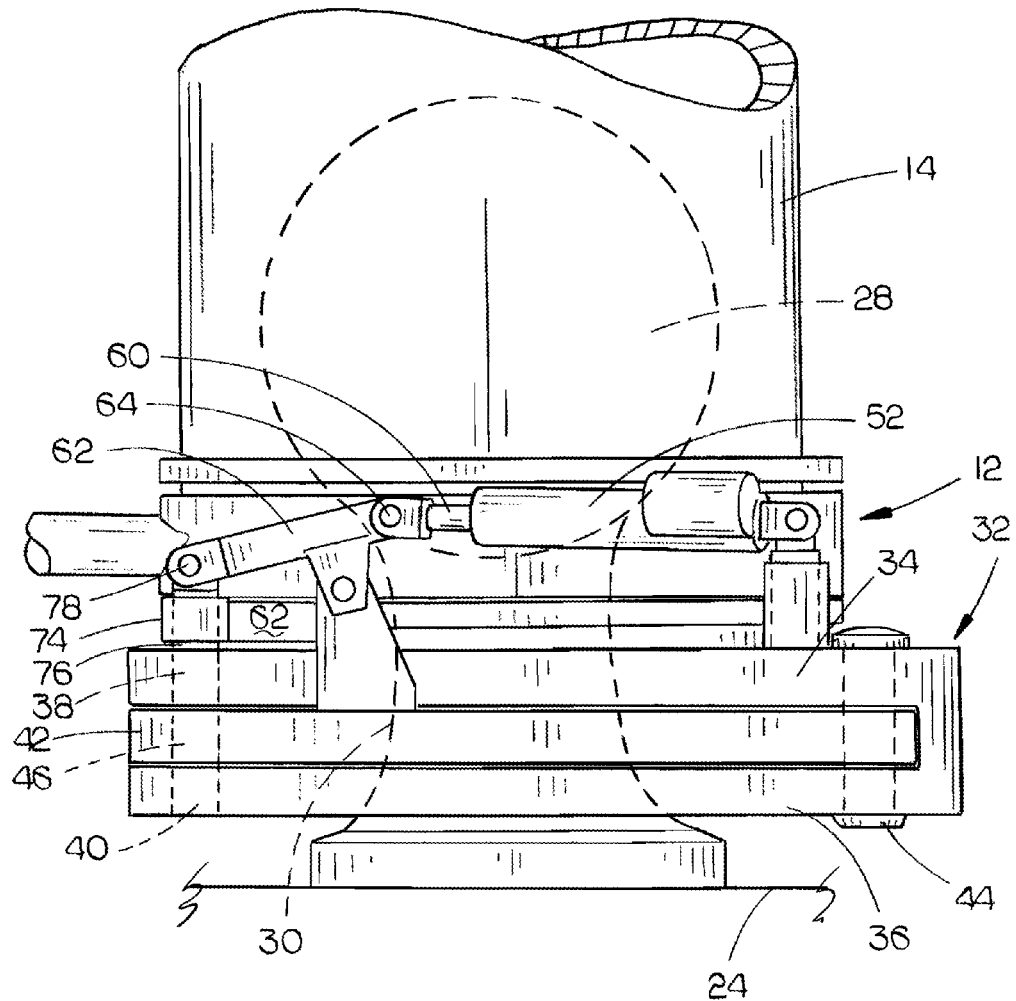
FIG. 7 is a side elevational view illustrating the coupling assembly of this invention locked onto the hitch ball of the vehicle.

Coupling assembly 12 includes a flange plate assembly 32 which is welded to the lower end of column 14 and which includes an upper plate 34 and a lower plate 36 which is spaced below the upper plate 34. Each of the plates 34 and 36 have central openings formed therein which register with the socket coupling in the lower end of column 14. Plate 34 has a pin opening 38 formed therein as seen in FIG. 2. Plate 36 has a pin opening 40 formed therein which registers with pin opening 38, as seen in FIG. 4. A locking plate 42 is movably positioned between plates 34 and 36 (FIG. 7) and is pivotally secured to plates 34 and 36 by a pivot pin 44 (FIG. 7). Plate 42 is movable between an unlocked position, as seen in FIGS. 1, 2 and 5, to the locked position of FIGS. 6 and 7. Plate 42 has a pin opening 46 formed therein which registers with pin openings 38 and 40 when plate 42 is in its locked position. Plate 42 has a semi-circular inner end 48 which is positioned closely adjacent the shank 30 of hitch ball 26 when locking plate 42 is in its locked position.

The numeral 50 refers to an actuator assembly for pivotally moving locking plate 42 between its locked and unlocked positions and for maintaining locking plate 42 in its locked position. Assembly 50 includes an electrically linear actuator 52 which may be DC battery operated or operated by the vehicle or trailer electrical system. Actuator 52 is also remotely radio controlled by a hand-held transmitter 54. The base end of actuator 52 is pivotally connected to the upper end of a post 56 by a pivot pin 58. The lower end of post 56 is fixed to plate 34. The actuator rod 60 is pivotally connected to one end of an elongated arm 62 by pivot pin 64. Arm 62 has a bracket 66 secured thereto which extends downwardly therefrom, as seen in FIG. 2. The lower end of bracket 66 is pivotally secured to the upper end of a post 68 by pivot pin 70. The lower end of post 68 is fixed to locking plate 42, as seen in FIG. 2.

One end of support arm 72 is secured to post 68 and extends therefrom as seen in FIG. 2. A tubular support 74 is secured to the other end of support arm 62 (FIG. 2). The upper end of locking pin 76 is pivotally connected to arm 62 by pivot pin 78. Locking pin 76 is vertically slidably movably received by tubular support 74.

Initially, when actuator 52 is in its retracted position, the rod 60 will have pivotally pulled locking plate 42 to its unlocked position. The initial extension of rod 60 from actuator 50 causes locking plate 42 to be moved to its locked position. Continued extension of rod 60 from actuator 50 will cause locking pin 76 to be moved downwardly through tubular support 74, through opening 38 in plate 34, through opening 46 in locking plate 42 and through opening 40 in plate 36.

Although it is preferred that the locking pin 76 be employed, in some situations locking pin 76 may not be necessary since the extended rod 60 of linear actuator 52 will maintain locking plate 42 in its locked position.

As stated above, safety structure 16 includes a locking receptacle structure 18 and a locking member 20. Safety structure 16 is designed to replace the safety chains that would normally be used to prevent separation of the trailer from the truck 22 should the column 14 become disconnected from the hitch ball 26. Locking member 20 includes a ring member 80 which rotatably embraces column 14 between retaining rings or collars 82 and 84 which are fixed to column 14. Locking member 20 includes a shaft or rod 86 which is secured to ring member 80 and extends horizontally outwardly therefrom. A transversely extending shaft or rod 88 is secured to the outer end of shaft or rod 88, as seen in FIG. 2.

Figure 3:
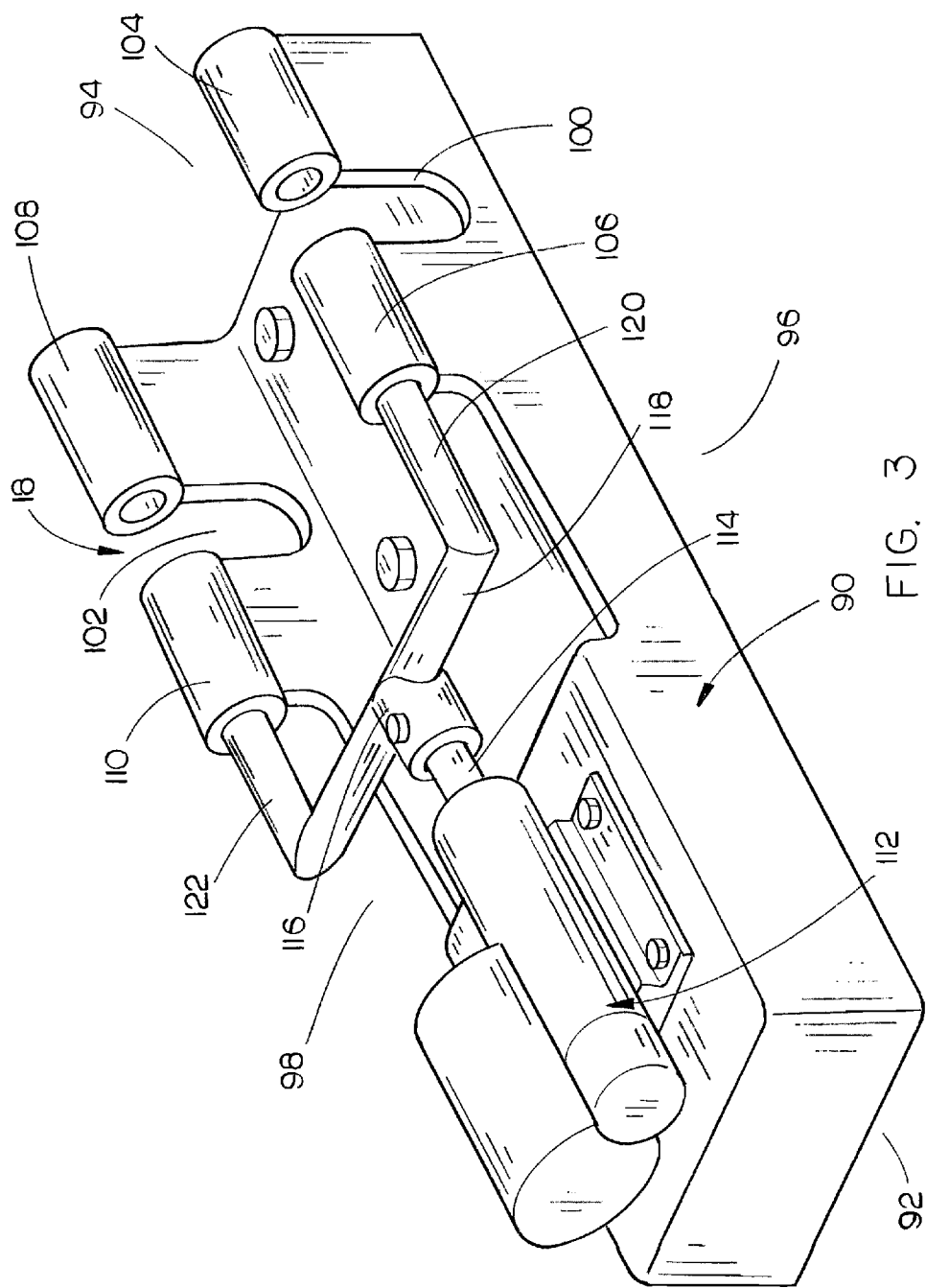
FIG. 3 is a perspective view of the locking receptacle structure of this invention.

Locking receptacle structure 18 includes a base 90 which is secured to floor 24 forwardly of hitch ball 26, as seen in FIG. 1. For purposes of description, base 90 will be described as having a forward end 92, a rearward end 94, a first side 96 and a second side 98. A U-shaped notch 100 is formed in side 96 adjacent the rearward end thereof (FIG. 3). A U-shaped notch 102 is formed in side 98 adjacent the rearward end thereof (FIG. 3). Spaced-apart tubes or collars 104 and 106 are provided at the upper rearward end of side 96 of base 90 on opposite sides of notch 100 (FIG. 3). Spaced-apart tubes or collars 108 and 110 are provided on the upper rearward end of side 98 of base 90 on opposite sides of notches 108 and 110 (FIG. 3).

The numeral 112 refers to a linear actuator which may be powered by DC battery or the electrical system of the truck 10. Linear actuator 112 includes a rod 114 which extends therefrom in conventional fashion and which is movable between retracted and extended positions. Actuator 112 is radio controlled by way of the hand-held transmitter 54. A collar 116 is secured to the outer end of rod 114 (FIG. 3). A transversely extending shaft or rod 118 is secured to collar 116. Shaft or rod 120 extends rearwardly from one end of shaft 118 and a shaft or rod 122 extends rearwardly from the other end of shaft 118. As seen, shaft 120 is selectively slidably received in collars 106 and 104 while shaft 122 is selectively slidably received in collars 110 and 108. When rod 114 is in its retracted position of FIG. 3, the rearward ends of shafts 120 and 122 are disposed within collars 106 and 110 respectively so that the upper ends of notches 100 and 102 are open. When rod 114 is extended, the rearward ends of shaft 120 and 122 are received by collars 104 and 108 respectively to close the upper ends of notches 100 and 102 respectively.

The method of operating the invention will now be discussed. Assuming that the trailer having the gooseneck hitch assembly thereon is disconnected from the vehicle, the gooseneck hitch assembly will normally be supported by a jack so that the lower end of the column 14 is positioned above the ground or supporting surface. Usually, the linear actuator 52 will be in the retracted position so that locking plate 42 is in its unlocked position and so that the lower end of pin 76 dwells in a plane above upper plate 34 as illustrated in FIG. 4. At this time, the linear actuator 112 of locking receptacle structure 18 will be in the retracted position of FIG. 3 so that the upper end of notches 100 and 102 are not closed by the shafts 120 and 122 respectively.

The vehicle 22 will then be moved rearwardly with respect to the trailer until the ball 28 of hitch ball 26 is directly below the coupling assembly 12 (FIG. 4). If the linear actuator 52 is powered by the vehicle electrical system, the electrical system of the vehicle 22 will be electrically connected to the linear actuator 52. If the linear actuator 52 is battery powered, there is no need to electrically connect the vehicle electrical system to the linear actuator 52.

When the coupling assembly 12 is in the position of FIG. 4, the jack of the trailer will be operated to lower the coupling assembly 12 downwardly onto the hitch ball 26. During the lowering movement, the central openings in plates 36 and 34 will receive the ball 28 until the ball 28 is received by the hitch ball receiving socket in the lower end of column 14. During the lowering movement, the shaft 88 will be received by the notches 100 and 102 of the locking receptacle structure 18.

The linear actuator 52 is then remotely actuated by the transmitter 54 to cause the actuator rod 60 of actuator 52 to be extended. The extension of rod 60 initially causes the locking plate 42 to pivotally move from its unlocked position of FIGS. 4 and 5 to the locked position of FIG. 6. When the locking plate 42 is in the locked position of FIG. 6, the semi-circular inner end 48 thereof will be closely positioned adjacent shank 30 of hitch ball 26 to securely connect the coupling assembly 12 to the hitch ball 26. Continued extension of rod 60 will cause locking pin 76 to move downwardly through opening 38 in plate 34, through opening 46 in locking plate 42, and through opening 40 in plate 36 to lock coupling assembly 12 onto hitch ball 26. As stated above, the locking pin 76 adds further locking security to the coupling operation. As also stated above, in some cases the locking pin 76 may not be necessary since the linear actuator 52 also acts as a locking device.

When the coupling assembly 12 has been secured to the hitch ball 26, the linear actuator 112 is activated by the transmitter 54 to cause the rod 114 to be extended which causes the shafts 120 and 122 to be moved rearwardly into the collars 104 and 106 respectively to lock the shaft 88 in the notches 100 and 102 to provide a safety system rather than conventional safety chains.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a towing vehicle having a hitch ball mounted in the bed thereof, comprising:
    a trailer having a gooseneck hitch structure at the forward end thereof with the gooseneck hitch structure including a substantially vertically extending column having a lower end;
    said lower end of said column having a hitch ball receiving socket formed therein configured to selectively receive the hitch ball of the vehicle therein;
    a locking receptacle structure mounted on the bed of the vehicle forwardly of the hitch ball;
    said locking receptacle structure including a base having a forward end, a rearward end, a first side and a second side;
    said base having an upstanding first wall with an upper end at said first side of said base;
    said first wall having a vertically disposed notch, having inner and lower ends, formed therein which extends downwardly thereinto;
    said base having an upstanding second wall with an upper end at said second side of said base;
    said second wall having a vertically disposed notch, having upper and lower end, formed therein which extends downwardly thereinto;
    an electrically operated and RF controlled linear actuator mounted on said base;
    said linear actuator including an extendible and retractable actuator rod which extends rearwardly therefrom;
    a horizontally disposed locking mechanism secured to said actuator rod for movement therewith;
    said locking mechanism being movable between an unlocked position and a locked position;
    said locking mechanism being in said unlocked position when said actuator rod is in a retracted position;
    said locking mechanism being in said locked position when said actuator rod is in an extended position;
    said locking mechanism extending over the upper ends of said notches in said first and second walls, when said locking mechanism is in said locked position, to close said upper ends of said notches;
    a horizontally disposed collar rotatably embracing said column;

an elongated first shaft, having forward and rearward ends, secured to said collar and which extends forwardly therefrom;

and an elongated second shaft secured to said first shaft which extends transversely with respect to said first shaft;

said second shaft having first and second ends which are configured to be received within said notches of said first and second walls when said locking mechanism is in said unlocked position;

said second shaft being maintained within said notches when said locking mechanism is in said locked position.

2. In combination with a towing vehicle having a hitch ball mounted in the bed thereof, comprising:

a trailer having a gooseneck hitch structure at the forward end thereof with the gooseneck hitch structure including a substantially vertically extending column having a lower end;

said lower end of said column having a hitch ball receiving socket formed therein configured to selectively receive the hitch ball of the vehicle therein;

a horizontally disposed upper plate secured to said lower end of said column;

said upper plate having a hitch ball receiving opening formed therein;

a horizontally disposed lower plate operatively secured to said lower end of said column below said upper plate;

said lower plate being spaced from said upper plate;

said lower plate having a hitch ball receiving opening formed therein which registers with said hitch ball receiving opening in said upper plate;

a horizontally disposed locking plate movably positioned between said upper and lower plates;

said locking plate being pivotally secured to said upper and lower plates about a vertical axis and being selectively movable between an unlocked position and a locked position;

said locking plate having a semi-circular portion which is closely positioned to the hitch ball when said locking plate is in said locked position;

and an electrically operated and RF controlled linear actuator having a base end and an extendible and retractable actuator rod;

said base end of said linear actuator being secured to said upper plate;

said actuator rod being secured to said locking plate whereby extension of said actuator rod causes said locking plate to move from its said unlocked position to its said locked position and whereby retraction of said actuator rod causes said locking plate to be moved from its said locked position to its said unlocked position;

a locking receptacle structure mounted on the bed of the vehicle forwardly of the hitch ball;

said locking receptacle structure including a base having a forward end, a rearward end, a first side and a second side;

said base having an upstanding first wall with an upper end at said first side of said base;

said first wall having a vertically disposed notch, having inner and lower ends, formed therein which extends downwardly thereinto;

said base having an upstanding second wall with an upper end at said second side of said base;

said second wall having a vertically disposed notch, having upper and lower end, formed therein which extends downwardly thereinto;

an electrically operated and RF controlled linear actuator mounted on said base;

said linear actuator including an extendible and retractable actuator rod which extends rearwardly therefrom;

a horizontally disposed locking mechanism secured to said actuator rod for movement therewith;

said locking mechanism being movable between an unlocked position and a locked position;

said locking mechanism being in said unlocked position when said actuator rod is in a retracted position;

said locking mechanism being in said locked position when said actuator rod is in an extended position;

said locking mechanism extending over the upper ends of said notches in said first and second walls, when said locking mechanism is in said locked position, to close said upper ends of said notches;

a horizontally disposed collar rotatably embracing said column;

an elongated first shaft, having forward and rearward ends, secured to said collar and which extends forwardly therefrom;

and an elongated second shaft secured to said first shaft which extends transversely with respect to said first shaft;

said second shaft having first and second ends which are configured to be received within said notches of said first and second walls when said locking mechanism is in said unlocked position;

said second shaft being maintained within said notches when said locking mechanism is in said locked position.

3. The combination of claim 2 further including a selectively vertically movable locking pin which is operatively secured to said actuator rod and said locking plate; said locking pin being movable between an upper unlocked position to a lower locked position; said locking pin, when in said locked position, locking said locking plate to said upper and lower plates.

4. The combination of claim 2 wherein the extension of said actuator rod causes said locking pin to be moved from its said unlocked position to its said locked position and whereby retroaction of said actuator rod causes said locking pin to be moved from its said locked position to its said unlocked position.

5. The combination of claim 2 wherein each of said upper plate, said locking plate and said lower plates have a locking pin opening formed therein and wherein said locking plate extends downwardly through said locking pin openings when said locking plate is in said locked position and when said locking pin is in said locked position.

6. In combination with a towing vehicle having a hitch ball mounted in the bed thereof, comprising:

a trailer having a gooseneck hitch structure at the forward end thereof with the gooseneck hitch structure including a substantially vertically extending column having a lower end;

said lower end of said column having a hitch ball receiving socket formed therein configured to selectively receive the hitch ball of the vehicle therein;

a horizontally disposed upper plate secured to said lower end of said column;

said upper plate having a hitch ball receiving opening formed therein;

a horizontally disposed lower plate operatively secured to said lower end of said column below said upper plate;

said lower plate being spaced from said upper plate;

said lower plate having a hitch ball receiving opening formed therein which registers with said hitch ball receiving opening in said upper plate;

a horizontally disposed locking plate movably positioned between said upper and lower plates;

said locking plate being pivotally secured to said upper and lower plates about a vertical axis and being selectively movable between an unlocked position and a locked position;

said locking plate having a semi-circular portion which is closely positioned to the hitch ball when said locking plate is in said locked position;

and an electrically operated and RF controlled linear actuator having a base end and an extendible and retractable actuator rod;

said base end of said linear actuator being secured to said upper plate;

said actuator rod being secured to said locking plate whereby extension of said actuator rod causes said locking plate to move from its said unlocked position to its said locked position and whereby retraction of said actuator rod causes said locking plate to be moved from its said locked position to its said unlocked position;

a selectively vertically movable locking pin operatively secured to said actuator rod and said locking plate;

said locking pin being movable between an upper unlocked position to a lower locked position;

said locking pin, when in said locked position, locking said locking plate to said upper and lower plates.

7. The combination of claim 6 wherein the extension of said actuator rod causes said locking pin to be moved from its said unlocked position to its said locked position and whereby retroaction of said actuator rod causes said locking pin to be moved from its said locked position to its said unlocked position.

8. The combination of claim 6 wherein each of said upper plate, said locking plate and said lower plates have a locking pin opening formed therein and wherein said locking plate extends downwardly through said locking pin openings when said locking plate is in said locked position and when said locking pin is in said locked position.

* * * * *